United States Patent [19]

Shelton

[11] Patent Number: 4,654,561
[45] Date of Patent: Mar. 31, 1987

[54] PLASMA CONTAINMENT DEVICE

[76] Inventor: Jay D. Shelton, 1126 16 Rd., Fruita, Colo. 81521

[21] Appl. No.: 785,016

[22] Filed: Oct. 7, 1985

[51] Int. Cl.$^4$ .................................................. H01J 7/24
[52] U.S. Cl. .......................... 315/111.71; 315/111.41; 376/122; 376/130
[58] Field of Search ...................... 315/111.71, 111.41, 315/111.21; 376/144, 130, 121, 122

[56] References Cited

U.S. PATENT DOCUMENTS

3,160,566 12/1964 Dandl et al. ........................ 376/130
3,218,235 11/1965 Ehler ................................... 376/130

Primary Examiner—Harold Dixon
Attorney, Agent, or Firm—Klaas & Law

[57] ABSTRACT

A plasma containment device for generating and sustaining a ball of plasma therein including an enclosure; a primary electromagnet for generating a primary magnetic field in said enclosure; gas jets positioned at terminal end portions of the primary magnet pole pieces for providing gas under pressure to said enclosure during initial pressurization and for preventing touching contact between electromagnet opposite pole pieces and a plasma ball generated in said enclosure; gas discharge apparatus for selectively sealing said enclosure and for discharging gas from said enclosure; gas ionization apparatus for ionizing gas to form a plasma ball; and plasma energizing apparatus for selectively providing energy to said plasma ball, and for maintaining a large circular electric current in said plasma ball.

25 Claims, 8 Drawing Figures

PLASMA CONTAINMENT DEVICE

BACKGROUND OF THE INVENTION

The present invention relates generally to plasma containment devices and, more particularly, to a plasma containment device adapted to simulate, in a controlled environment, some of the environmental conditions present during the propagation of natural ball lightning in order to provide a plasma ball capable of being sustained indefinitely.

Plasma is generally defined as a fully ionized gas in which the gas ions and disassociated electrons form a neutral matter. Plasma, because of its unique physical and chemical properties, has many uses in experimental physics and is studied as a separate branch of physics known as Plasma-Physics. One potential use of the plasma of low atomic number gases such as hydrogen is the generation of heat energy through controlled nuclear fusion. However, a problem with this potential application and with plasma generation in general has been the difficulty of containing a mass of plasma at a fixed location for any substantial duration of time. Prior art plasma containment devices have generally attempted to stabilize a mass of plasma by providing a surrounding magnetic field. However, such devices have not been effective to date because of plasma leakage and discharge usually in the area of the poles of the magnetic field or in cusp areas of the magnetic field. Various attempts to overcome this problem through providing special magnetic field configurations have been ineffective. Examples of prior art devices attempting to solve the problem of plasma containment are numerous.

Hatch, U.S. Pat. No. 3,120,477 which is hereby incorporated by reference, describes "a method of confining and compressing a plasma discharge comprising evacuating a radiofrequency cavity, introducing at a low pressure a low Z gas into said cavity, and exciting at a particular frequency stationary electromagnetic waves in only the $TE_{210}$ magnetic quadrupole mode within said cavity, said electromagnetic waves ionizing said low Z gas and confining and compressing the plasma therefrom at the center of said cavity; and a method of confining and compressing a plasma discharge comprising evacuating a radiofrequency cavity, exciting at a particular frequency stationary electromagnetic waves in only the $TE_{210R}$ magnetic quadrupole mode within said cavity, and introducing at a low pressure a low Z gas into said cavity, said electromagnetic waves ionizing said low Z gas and confining and compressing the plasma therefrom at the center of said cavity; and a method of confining and compressing a plasma discharge comprising evacuating a radiofrequency cavity, exciting at a particular frequency stationary electromagnetic waves in the $TE_{210R}$ magnetic quadrupole mode within said cavity, introducing at a low pressure a low Z gas into said cavity about the center thereof, said electromagnetic waves ionizing said low Z gas and confining and compressing the plasma therefrom at the center of said cavity."

Friedrichs et al., U.S. Pat. No. 3,141,826, which is hereby incorporated by reference, describes, "In a plasma device having a container, a gas of low atomic weight, and means for heating and ionizing said gas to form a substantially perfectly conducting plasma within the container, the improvement comprising first and second current conducting coils displaced from each other along the length of the device in parallel planes at opposite ends of the plasma means for energizing said coils with oppositely directed equal currents for forming a convex plasma-field interface in which magnetic lines of force intersect to form a bi-conical monocusp having opposite point cusps connected to an annular line cusp midway therebetween, said current being sufficiently large such that the ratio of plasma pressure to magnetic field pressure is equal to one, and means for rapidly increasing said current for adiabatically compressing said plasma; and further including a current conductor positioned in the center of the plasma along the length thereof between said point cusps, and means for rapidly increasing the current flow in said current conductor for adiabatically compressing said plasma from its center outwardly."

Dandl et al., U.S. Pat. No. 3,160,566, which is hereby incorporated by reference, describes, "a method of producing a stable, energetic, dense plasma within an evacuated reflecting cavity disposed within an evacuated enclosure permeated by axially symmetric magnetic mirror fields comprising the steps of evacuating said cavity and said enclosure to a first selected pressure, feeding high frequency microwave energy of a selected power and frequency into said evacuated reflecting cavity, establishing said magnetic fields at a strength such that the electron cyclotron frequency is made equal to the frequency of said microwave energy, the electrons within said cavity being heated by said microwave energy along lines of constant magnetic flux provided by said magnetic fields, said heated electrons ionizing the background gas within said cavity to form a primary plasma, feeding gas at a selected critical rate into said cavity and simultaneously raising the pressure within said enclosure and cavity to second and third pressures, respectively, said critical gas feed rate being proportional to the selected operating power of said microwave energy for any selected cavity size, whereby a stable plasma blanket is formed surrounding said primary plasma, said blanket shielding said primary plasma from neutral particles and rendering said primary plasma stable, energetic and dense."

Uleski, U.S. Pat. No. 3,614,525, which is hereby incorporated by reference, describes, "an apparatus including plasma compression means for compressing a plasma toward a centrally disposed three-dimensional region, said plasma compression means comprising, in combination, means for generating a plasma, three-dimensional envelope means surrounding said three-dimensional region for containing said plasma substantially all around said three-dimensional region, and three-dimensional magnetic field means having a three-dimensional magnetic field substantially surrounding said three-dimensional envelope, and said three-dimensional field having a three-dimensional weak field in the vicinity of said three-dimensional region and a three-dimensional strong field surrounding said three-dimensional weak field."

A majority of scientists now accept the reality of ball lightning. A paper prepared by the Applicant, which is reprinted below, provides a theoretical basis for explaining the existence of ball lightning as a special case of plasma generation in nature. This paper suggests that by providing conditions similar to the natural conditions responsible for the propagation of ball lightning that plasma may be generated and sustained in the laboratory.

BALL LIGHTNING AND BEAD LIGHTNING

Order-of-magnitude calculations show that ball lightning and bead lightning may consist of plasma containing a large electric current.

Ball Lightning

There is little scientific data on ball lightning or bead lightning. The data used in this paper have been cautiously extracted from the vast popular literature, some of which is unreliable. We will mathematically deduce the physical properties of our model and merely note that these properties tend to agree with reported observations. We will not use unreliable reports to build the theory. The statements made in this paper are not intended to be final, but represent a first attempt to open up a new area of investigation.

A typical globe of ball lightning may have a radius of 0.1 meter and a lifetime of a few seconds. A ball of plasma at atmospheric pressure would be much lighter than air, which contradicts observation. Furthermore, it is doubtful that a ball of plasma could have the observed stability or lifetime.

The model proposed is this: a lightning stroke may induce a circular eddy current in a pocket of plasma adjacent to the channel. Depending on the geometry, the eddy current could compare to, or even exceed, the peak current in lightning, approaching perhaps $10^6$ amperes. The ball of plasma containing this large circular current could persist after the lightning stroke has disappeared. The large magnetic field confines the plasma. The radius of a ball is comparable to the diameter of a lightning stroke, as one might expect if the currents are comparable.

Let $L = 2u_o r$ be the inductance of the ball, $u_o$ the magnetic permeability, $r$ the radius of the ball. Let $I$ be the current in the ball, $\phi$ the flux through the ball, $R$ the resistance of the ball, and $\epsilon$ the magnetic energy of the system. Elementary theory yields $$\epsilon = \tfrac{1}{2} I \phi \quad (1)$$

$$\phi = -IR \quad (2)$$

$$\epsilon = -I^2 R \quad (3)$$

where (1) is an elementary theorem, (2) is Faraday's law of induction, and (3) gives the energy loss due to electrical heating. Substitute (2) into (3)

$$\epsilon = I \phi \quad (4)$$

Divide (4) by (1) and integrate $$\epsilon/\epsilon = 2\phi/\phi$$

$$\epsilon = \text{constant} \times \phi^2$$

But from elementary theory, $$\epsilon = \phi^2 / 2L$$

This tells us that L is constant. Hence the radius and resistance of the ball should be nearly constant. The above equations are strictly true for a filamentary circuit, but should be approximately true for a continuous distribution. Another argument is as follows. If the radius of the ball expands, the total flux through the ball is constant. The flux through a fixed closed path inside the ball decreases, and by Faraday's law, an EMF is induced which increases the current there. The flux through a fixed path outside the ball increases (as oppositely oriented flux moves outside it). An EMF is induced which opposes the current there. If the ball tries to expand, new current is generated inside, and the original current at the boundary is annihilated. The current is trapped in the ball!

Inserting $\phi = LI$ in (2)

$$LI = -IR$$

$$I = I_o \exp(-Rt/L)$$

$$\epsilon = 1/2 LI^2 = u_o I_o^2 r \exp(-2Rt/L) = \epsilon_o \exp(-2t/T)$$

Inserting some numbers, $$\epsilon_o = u_o I_o^2 r = 10^{-6} (10^6)^2 10^{-1} = 10^5 \text{ joules}$$

In order to determine the lifetime T we must know the resistance R of the plasma. It is shown in kinetic theory that $$p = \sigma m v / 2e^2 = \sigma \sqrt{3mkT} / 2e^2$$

where $p$ is the resistivity of the plasma, $\sigma$ is the cross-section of an ion, m, v, e the mass, velocity, and charge of an electron, k is Boltzmann's constant, T the temperature. According to the CRC tables, the radius of N+ is 0.25 Å, and that of O+ is 0.22 Å. Assuming an average of 0.24 Å and a temperature of at least 15000° K., the same as lightning, we find $$p = 2 \times 10^{-8} \text{ ohm-meter}$$

which is about the same as that of copper. If the current is distributed over a semicircular area of radius r, $$T = L/R = 2u_o r/(2p/r) = u_o r^2/p = 10^{-6}(0.1)^2 10^{+8} = 1 \text{ second}$$

which agrees with observation.

If a ball expands significantly in time $\Delta t$, most of the flux will pass out of the original boundary of the ball. New current will be induced by Faraday's law:

$$\Delta \phi / \Delta t = LI_o / \Delta t = I_{new} R$$

$$\Delta t = (L/R)(I_o / I_{new})$$

Since flux is conserved, the new current cannot exceed the original current $I_o$, and so $66 \, t > L/R$.

A term K should be subtracted from the right side of equation (3), where $K = \tfrac{1}{2} m v^2$ is the kinetic energy of the gas. But $m = 0.01$ kg and $v = r/\Delta t = 0.1$ m/sec, so $K = 10^{-4}$ watt is smaller than $I^2 R = 10^5$ watts by a factor of $10^9$. Hence L is constant to within a few parts in $10^9$. Using this new constraint on r, one can iterate the above argument and conclude that L is constant and K is zero.

In a solid conductor, the flux would be frozen into the medium and therefore could not expand. In a fluid conductor, it seems possible that the fluid and the flux might expand together. However, the motion of the fluid is determined by the local pressure gradient, while the position of the flux is determined by the overall current distribution. It is highly improbable that the two motions would be identical. Expansion would upset the balance of magnetic and gas pressures. Chaotic or vibratory motion would be most likely; there is no mechanism capable of producing a coordinated expansion. A ball cannot expand slowly, as this would cause a discrepancy between the change of magnetic energy $\phi^2/2L$ and the change of kinetic energy $\frac{1}{2}mv^2$. For a short time interval, we have approximately $$\phi^2/2L + \tfrac{1}{2}mv^2 = \text{constant}$$

Taking the time derivative, recalling that flux is conserved $$(\phi^2/2L^2)\,\dot{L} = mva$$

Since L is proportional to v, then either v is identically zero, or else the acceleration a is determined and is quite large. A ball must expand explosively, or not at all. Hence the explosive solution is isolated, differing greatly from other solutions. Therefore a ball cannot readily make the transition from a quiescent solution to the explosive solution. In reality there will be some slippage of flux through the fluid, causing the generation of new current, which would absorb energy and hinder the expansion, as shown previously. But a slow expansion is impossible. An explosive expansion would almost certainly cause the generation of induced currents far greater than the original current, which is absurd. These conclusions are confirmed by observation.

According to the generally accepted theory of sunspots, the sun's differential rotation winds up magnetic field lines into cables, which are stable for years. Obviously there must be a large circular current inside a cable, to generate the magnetic field. Ball lightning is just a short length of magnetic cable, and is thus quite similar to a sunspot. Any hypothetical expansion of a cable or ball is immediately annulled by Faraday's law.

A small radial electric field would appear as a result of the Hall effect.

If diatomic air is heated to 15000° K., which is roughly 50 times room temperature, and broken into singly ionized ions and electrons, there are four times as many particles as before. Hence a pressure of $4 \times 50 = 200$ atmospheres would be needed to compress it to atmospheric density. The magnetic field is $$B = u_o I/2r = 6 \text{ webers/m}^2$$

The pressure of the field, which is the same as the energy density, is $$B^2/2u_o = 2 \times 10^7 \text{ nt/m}^2 = 200 \text{ atmospheres}$$

which is enough to compress the plasma to atmospheric density, which explains how balls can drift downward. As a ball ages, the field weakens, and plasma might escape, lightening the ball and forming rays or jets.

The energy of ionization in a 0.1 meter ball at atmospheric density is $$\frac{15 \text{ ev}}{\text{atom}} \cdot \frac{1.6 \times 10^{-19} \text{j}}{\text{ev}} \cdot \frac{6 \times 10^{23} \text{ atom}}{\text{mole}} \cdot \frac{\text{mole}}{.014 \text{ kg}} \cdot$$

$$\frac{1 \text{ kg}}{\text{m}} \cdot \frac{4\pi(.1)^3 \text{m}^3}{3} = 4 \times 10^5 \text{ joules}$$

which is larger than the magnetic or thermal energies. The power emitted by a ball would be about $10^5$ watts.

From the theory of energy transport, the luminosity of a ball is $$16\pi r \sigma^2 \lambda T^3 dT/dr = 10^5 \text{ watts}$$

which agrees with the previous estimate. Here $\sigma$ is the Stefan-Boltzmann constant and $1 = 10^{-5}$ meter is the mean free path of a photon according to published tables. The strong magnetic field would prevent convection.

Since parallel opposite currents repel, while L is constant, the circular shape of the current loop is stable. Apparently the current can spread out along the axis of rotation; round balls have been observed to become elongated and vice versa.

The ionized channel is not necessarily "pinched" to a small radius, since it is not in a vacuum and can add gas. The pinch effect simply insures that the channel gas pressure is equal to the magnetic pressure.

A ball need not carry any net charge, and the EMF around the loop, IR, is less than one volt, which explains why balls show little interest in grounded conductors. However, balls should be strongly magnetic, which has been observed.

The large current could easily prove fatal, which has been observed. Balls could vary according to the initial radius and current, and the degree of contamination with water, dirt, wood, etc.

As the plasma cools and loses its conductivity, the ball might become unstable and explode, which has been observed. The smell of sulphur so often reported is probably just ozone or nitrogen oxides.

In summary, this model explains the formation, size, energy, lifetime, density, stability, behavior, smell, and demise of ball lightning.

The next step on the theoretical front would be to calculate a detailed model of ball lightning, similar to a stellar structure. Experimentally, a ball could be created in the laboratory and studied. Since a ball is a natural tokamak, it would be of great interest to determine if a ball could be sustained or raised to a higher temperature by feeding energy into it, by RF or particle beams, for example. A ball could be held between two opposite magnetic poles, while streams of gas could be used to prevent the ball from touching the poles. It might be possible to maintain the current in the ball by spinning it with gas jets or ion beams; electrons and nuclei would be differentially retarded by the external magnetic field, due to their different magneto-resistance.

Bead Lightning

Bead lightning may result from the formation of a standing longitudinal current wave along the ionized channel, similar to the formation of loops and nodes in an organ pipe. The distance l between nodes is half a wavelength $\lambda$, and since $f\lambda$ is the velocity of propagation u, we find $f = u/2l$ is about a megahertz. Since this lies in the AM radio band, one might expect lightning to generate a great deal of radio noise, which is observed. The segments would oscillate with a common frequency, which would require them to be of equal length. The stroke would resemble a chain, a string of beads, or a series of dashes.

The lifetime of bead lightning would be, where r is the radius of the channel and l the length of a segment, $$T = L/R = \frac{(u_o/2\pi)l\ln(1/r)}{\rho l/\pi r^2} = 5 u_o r^2/\rho = 1 \text{ second}$$

which agrees with observation. The energy of a bead would be $\frac{1}{2}LI^2 = 10^6$ joules. The initial current in a bead would compare to the initial lightning current, which is obviously adequate to maintain the luminosity of the channel. One might expect the luminosity to diminish faster near the nodes, where the current is least. This is in fact observed; linear segments shrink to beads. Bead lightning has been clearly photographed by a movie camera, proving that a glowing plasma can exist for at least a second. This observation should help dispel doubts about the existence of ball lightning, since both forms consist of a plasma containing a large electric current.

Current pulses are observed to travel at about one-third the speed of light. This may be explained as follows. The high potential of the channel causes charge to migrate into the air, increasing the channel's effective capacitance. The capacitance of the channel itself is inversely proportional to ln (l/r), where l is the length of the channel and r the radius. But the space charge extends to roughly $\frac{1}{3}$, and so the effective capacitance exceeds the normal capacitance by a factor of about ln $(l/r)/\ln (l/\frac{1}{3}) = 10$. The velocity of propagation as given by the telegrapher's equation is $(LC)^{-\frac{1}{2}} = (10LC_o)^{\frac{1}{2}} = 0.32c$, where L and C are the inductance and capacitance per unit length. There is some ambiguity about the extent of the space charge; observationally there is some variability in the velocity of propagation. Photographs of lightning show many side-discharges, indicating the existence of space charge. The space charge would tend to move perpendicular to the channel, which would not significantly alter the inductance of the channel.

Exact Calculation

The fundamental equations are $$\nabla \times B = u_o J = u_o \sigma E \quad (1)$$

The calculation is simplified by use of the vector potential A.

$$B = \nabla \times A \quad (2)$$

$$E = -\dot{A} \quad (3)$$

which yields $$\nabla \times \nabla \times A + u_o \sigma \dot{A} = 0 \quad (4)$$

since $$A = \frac{u_o}{4\pi} \int \frac{J dT}{r} \quad (5)$$

then A, like J, is purely azimuthal. Let $$A = A(r,\theta) e^{-t/T} \quad (6)$$

If one substitutes $x = \cos\theta$, $k^2 = u_o \sigma/T$, $s = kr$, and $A = y(x)g(s)/\sqrt{s}$, then (4) separates to yield $$(1 - x^2)y'' - 2xy' + \left[ n(n+1) - \frac{1}{1-x^2} \right] y = 0 \quad (7)$$

$$s^2 g'' + sg' + (s^2 - n(n+1) - \frac{1}{4}) g = 0 \quad (8)$$

where n(n+1) is the constant of separation. Equation (7) is the equation for the associated Legendre functions $p_n^m(x)$ with m=1. The constant n must be integral for the solutions to converge for all x. The function vanishes for n=0, and n≥2 describe multipole configurations, so we take $y = P_1^1(x) = (1-x^2)^{\frac{1}{2}} = \sin\theta$.

Equation (8) is Bessel's equation, the physical solution of which is $J_p(s)$, where $p^2 = n(n+1) + \frac{1}{4}$. Since n=, p=3/2. Hence $$A = \frac{J_{3/2}(s)}{\sqrt{s}} \sin\theta$$

The magnetic field B is determined by the curl of A.

$$B_s = \frac{2 J_{3/2}}{s^{3/2}} \cos\theta$$

$$B_\theta = -\frac{s J_{1/2} - J_{3/2}}{s^{3/2}} \sin\theta$$

$$s < s_o$$

The above equations hold for the interior of the sphere. Outside the radius $r_o$ of the sphere, the conductivity $\sigma = 0$. Equation (8) becomes $$s^2 g'' + sg' - p^2 g = 0$$

and the physical solution is $g = s^{-p} = s^{-3/2}$. We find $$A = \sin\theta/s^2$$

from which $$B_s = 2 \cos\theta/s^3$$

$$B_\theta = \sin\theta/s^3$$

$$s > s_o$$

A multiplicative factor b remains undetermined for the inside values. Equating the inside and outside values of $B(s_o)$ enables to determine that $b = 1/\sqrt{2\pi}$ and $s_o = \pi$. Since $kr_o = s_o$, we find $k = \pi/r_o$ and $T = u_o \sigma r_o^2/\pi^2$. One must multiply the equations for B by $u_o m k^3/4\pi$, where m is the magnetic moment, and set s=kr to complete the reduction to standard form.

Taking the curl of B, we find $$J = \frac{J_{3/2}}{\sqrt{s}} \sin\theta \cdot \frac{mk^4}{4\pi} \sqrt{2\pi}$$

Calculating $I = \int J dA$ we find m=0.44IA, where $A = \pi r_o^2$. The mean current lies at about $\frac{2}{3} r_o$. At the center, $B = 0.72 u_o I/r_o$, at the equator, $B = 0.11 u_o I/r_o$, and at the poles, $B = 0.22 u_o I/r_o$.

From the equation $$\nabla p = J \times B$$

one can deduce that the pressure p is approximately equal to $u_o J^2/k^2$, but there is no exact solution because the curl of J×B is not zero. The gas will circulate on a time scale comparable to the lifetime of the ball, which would cause the generation of induced currents comparable to the original current, as required. The mean pressure is comparable to the magnetic energy density.

In reality there is no static solution, the conductivity is not likely to be constant, and a ball may not be spherical. The above calculations serve to indicate the difficulty of the subject, and to justify the order-of-magnitude approach.

Conclusion

There are hundreds of reports of magnetic effects generated by ball lightning. A magnetic field must arise from an electric current. In a finite body, an electric current must follow a closed path. Furthermore, a large magnetic field is the only agent capable of compressing plasma to atmospheric density. One must conclude that ball lightning consists of a ball of plasma containing a large circular electric current, which would plausibly arise as an eddy current generated by lightning. As the eddy current absorbs energy from the stroke, it would necessarily exert a back-EMF on the lightning channel, causing a voltage drop across the region. This "bottleneck" in the channel could cause a tremendous amount of energy to become concentrated in the region and transferred to the ball. A dense, hot plasma would be highly opaque, preventing rapid energy loss.

The virial theorem forbids the existence of a high-energy equilibrium ball of plasma. However, ball lightning is not an equilibrium system; if one waits until equilibrium is reached, ball lightning ceases to exist, in agreement with the virial theorem. According to Landau and Lifshitz (*The Classical Theory of Fields*, p. 95) the emission of radiation indicates that a system is not in equilibrium. Even if a ball could be sustained by feeding energy into it, this system, like a waterfall, would be in a steady-state, but not in equilibrium. Hence the virial theorem is inapplicable and nothing prevents the temporary existence of ball lightning, a conclusion which certainly agrees with observation. Similarly, the virial theorem does not forbid the existence of lightning, because lightning is not an equilibrium system.

A quasar may resemble a giant specimen of ball lightning. Energy is supplied by gas falling into a central black hole, which is surrounded by orbiting plasma containing a large circular electric current generated by the self-excited dynamo effect. Since the plasma orbits at nearly the speed of light, the Hall effect would cause the formation of a large radial electric field. Particles accelerated away along polar magnetic lines could form jets. Smaller systems might contain a central neutron star or white dwarf.

According to this model, eddy currents, ball lightning and sunspots are all basically the same, providing a much-needed unification of concepts. It can scarcely be argued that this model is unstable, since sunspots exist and are stable. The instabilities found in a linear tube of plasma evidently are suppressed by a spherical geometry which allows Faraday's law to weld the entire system into an integral unit. If one still doubts the stability of this model, it should be noted that all other models have the same problem. We have shown that this model explains a large array of observations, which is strong evidence that the model is correct, even if it is not completely understood. By analogy, we know that a tornado consists of circular wind, even though its stability is far from obvious.

Other investigators have considered models similar to this, but seem to have foundered because the intrinsic stability was not recognized, and the virial theorem was erroneously applied. An influential paper by V. D. Shafranov concluded from a hydrodynamic analogy that an external magnetic field is necessary for the stability of a ball of plasma. However, the set of equations used by Shafranov did not include Faraday's law, and therefore the model derived is not a reliable description of reality. In fact, Faraday's law stabilizes the ball. (See Singer).

References:

*The Lightning Book*, Peter E. Viemeister, Doubleday and Co., New York, 1961

*Lightning*, R. H. Golde, Academic Press, New York, 1977

*The Nature of Ball Lightning*, Stanley Singer, Plenum Press, New York, 1971

*Ball Lightning and Bead Lightning*, James D. Barry, Plenum Press, New York, 1980

SUMMARY OF THE INVENTION

The present invention comprises a method and apparatus for generating and maintaining a plasma ball by providing conditions similar to those found in nature during the generation and life span of natural ball lightning. However, the present invention is capable of maintaining a plasma ball indefinitely by carefully monitoring and controlling the conditions within an enclosed environment subsequent to the generation of the plasma ball.

Thus, the invention may comprise a plasma containment device for generating and sustaining a ball of plasma therein comprising:

(a) enclosure means for providing a sealed environment for plasma formation;

(b) primary electromagnet means having oppositely positioned pole pieces positioned in coaxial alignment with a magnetic field central axis for generating a primary magnetic field in said enclosure means;

(c) gas jet means positioned at terminal end portions of pole pieces in generally parallel alignment therewith for providing gas under pressure to said enclosure means for subsequent ionization for plasma ball formation during an initial pressurization mode of operation and for preventing touching contact between said electromagnet opposite pole pieces and a plasma ball generated in said enclosure in a plasma ball sustaining mode of operation;

(d) gas discharge means for selectively sealing said enclosure during said initial pressurization mode of operation and for discharging gas from said enclosure during said plasma ball sustaining mode of operation;

(e) gas ionization means for ionizing gas at a central position within said magnetic field during said initial pressurization mode of operation;

(f) plasma energizing means for selectively providing energy to said plasma ball during said plasma ball sustaining mode of operation for maintaining an energy level in said plasma ball of a selected magnitude.

The invention may also comprise a method for generating and maintaining a mass of plasma at a relatively fixed location comprising the steps of:

(a) directing purified gas of a predetermined molecular type under pressure into a confined enclosure until the gas pressure in the enclosure reaches a first predetermined value;

(b) maintaining the gas in the enclosure at the first predetermined pressure value;

(c) providing a primary magnetic field in the enclosure of a generally symmetrical predetermined configuration and predetermined intensity;

(d) adding sufficient energy to the pressurized gas at a central position within the magnetic field to ionize the gas so as to provide a plasma ball at a centered position in the magnetic field;

(e) reducing the pressure in the vessel to below a second predetermined value;
(f) rotating the plasma ball through selective gas discharge from gas nozzles positioned near the periphery of the enclosure and subsequently discharging the gas from the enclosure;
(g) maintaining the plasma ball at a relatively central position within the enclosure through continuous application of the primary magnetic field and through gas discharge from gas nozzles discharging generally toward the center of the enclosure and positioned proximate terminal magnetic poles of the magnet providing the primary magnetic field.

DETAILED DESCRIPTION OF THE INVENTION

The plasma containment device 10 of the present invention is adapted for generating and sustaining a plasma ball 11 within an enclosure means such as containment vessel 12. In the preferred embodiment, illustrated in FIGS. 1 and 2, the containment vessel is spherical in shape having perpendicular horizontal axes XX and YY and vertical axis ZZ intersecting at the center of the vessel 13. In the preferred embodiment, the walls of the containment vessel are constructed from highly heat resistant and heat transmissive material such as stainless steel which may form an interface with a surrounding heat absorbing material which may be, for example, a high density liquid salt solution or, for example, a highly heat conductive solid material which is provided with a plurality of liquid passageways for transferring heat from the solid mass to other remotely positioned heat dissipation devices or heat utilizing devices such as, for example, steam generators. Various structures and methods for conducting heat away from a high intensity heat source are well known in the art and may be utilized with the present invention depending upon the size of the apparatus and the particular use which is made of the invention.

A primary electromagnetic means such as electromagnet 14 having iron core 16 enclosed in an electrical coil 18 is provided for generating a primary magnetic field 24 within the enclosure device. The magnetic field 26 is adapted to encompass a plasma ball 11 during initial generation and subsequent containment thereof. An upper hemispherical pole piece 20 and a lower hemispherical pole piece 22 are positioned in coaxial relationship with vessel vertical axis ZZ. The pole pieces are located symmetrically with respect to the plane defined by the horizontal axes XX, YY of the containment vessel 12 and are positioned in close proximity to the surface of the containment vessel. In one preferred embodiment, the diameter of the containment vessel is approximately 3 feet, the diameter of a hemispherical pole piece is approximately 1 foot and the distance between pole pieces is approximately 2 feet. The electromagnet 14 is adapted to develop a magnetic field sufficient for containment of a plasma ball. In one embodiment contemplated for generating a hydrogen based plasma ball having a diameter of approximately 1 foot, the magnetic field has a flux density of approximately 1 tesla, which may be generated by a conventional coil magnet. It will be appreciated that lines of flux 26, 28, 30, etc. provided by magnetic field 24 have a symmetrical shape with respect to axis ZZ as illustrated in FIG. 1, unless acted upon by an outside energy source.

Gas jet means are provided and may be used to both maintain the position of the plasma ball at a relatively centered position within the containment vessel as well as to produce rotation of the plasma ball within the magnetic field 24. In one preferred embodiment of the gas jet means, as illustrated in FIG. 1, the gas jet means comprises an upper gas jet 40 and a lower gas jet 42 having axes AA and BB, respectively, positioned in parallel alignment with vertical axis ZZ and located at a generally central position within the associated hemispherical pole pieces 20, 22. The gas flow through the jets 40, 42 is controlled by control valve 44 having remote control signal wires 46 and control valve 48 having remote control signal wires 50 operably connected thereto. The control valves 44, 48 are controlled by signals received through wires 46, 50. In a preferred embodiment, the control signals generated for controlling the gas flow through these valves and associated jets 40, 42 are generated by computer. The gas flow rate may be varied differentially to cause relative vertical displacement of the plasma ball away from the gas jet having the greater flow rate in order to maintain the plasma ball at a vertically centered position within the containment vessel 12. Lateral gas jets 45, 47, FIG. 3, may be provided for lateral positioning of the plasma ball as described in further detail hereinafter.

Figure 1:
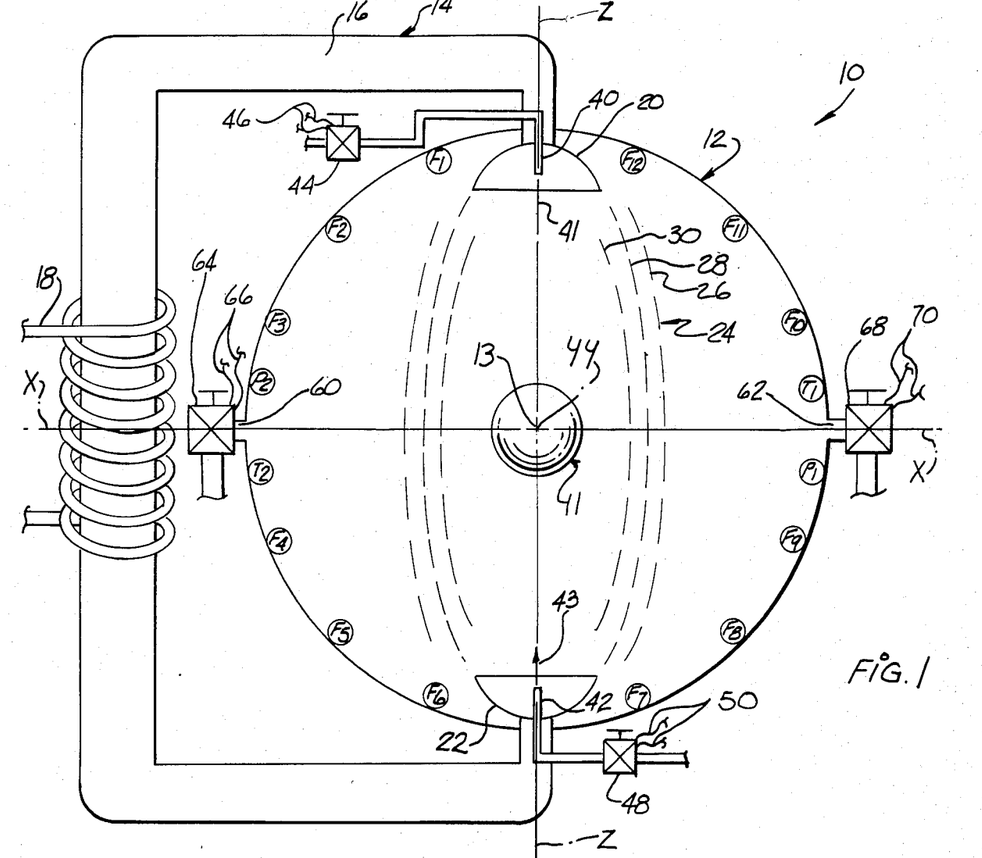
FIG. 1 is a schematic elevation view illustrating certain features of the plasma containment device of the present invention.

As illustrated by FIG. 1, gas discharge means are provided for selectively sealing the enclosure vessel 12 or for discharging gas from the enclosure vessel depending upon the particular mode of operation in progress. The gas discharge means, as embodied in FIG. 1, are positioned in parallel alignment with the XX axis although the discharge means might also be advantageously positioned at other points about the enclosure vessel 12. As illustrated In FIG. 1, the gas discharge means comprise a left gas discharge orifice 60 and a right gas discharge orifice 62, each associated with a control valve 64, 68, respectively. Each control valve, in turn, comprises a set of wires 66, 70 for receiving power and control signals from an appropriate control means such as a computerized controller. The gas discharge means is preferably of a type capable of differential opening and closing which may be controlled with respect to the gas inflow rate from the control jets to maintain a selected pressure. The gas discharge means may also be connected to a vacuum source, not shown, in order to facilitate gas discharge from the containment vessel 12. In a preferred embodiment, as illustrated schematically in FIG. 7, the gas jet flow into the vessel comes from a central high pressure reservoir 80 which is used to store gas of a predetermined molecular type such as hydrogen. The reservoir 80 may be initially pressurized by gas from a pressurized source 81 such as bottled gas etc. connected to reservoir 80 through control valve 82. After the reservoir has sufficient pressure, control valve 82 is closed. At system start up, gas is discharged into the vessel through gas jets controlled by control valves such as 44, 48, etc. which are schematically illustrated as a single control valve in FIG. 7. Gas discharges from vessel 12 as through ports 60, 62 and associated valves 64, 68 represented schematically as a single valve in FIG. 7. The discharge may be cooled as by a conventional cooling coil assembly 83 operatively associated with the gas discharge line 84. The discharge line 84 communicates with vacuum pump 85 which, in turn, discharges into compressor 86. Compressor 86 compresses the gas and delivers it to reservoir 80 where it may be again discharged into the vessel 12, etc. Thus, a gas recirculation and heat transfer system is provided which may be used to recirculate a purified gas and which may also be used as a secondary heat transfer means.

Figures 2, 7:
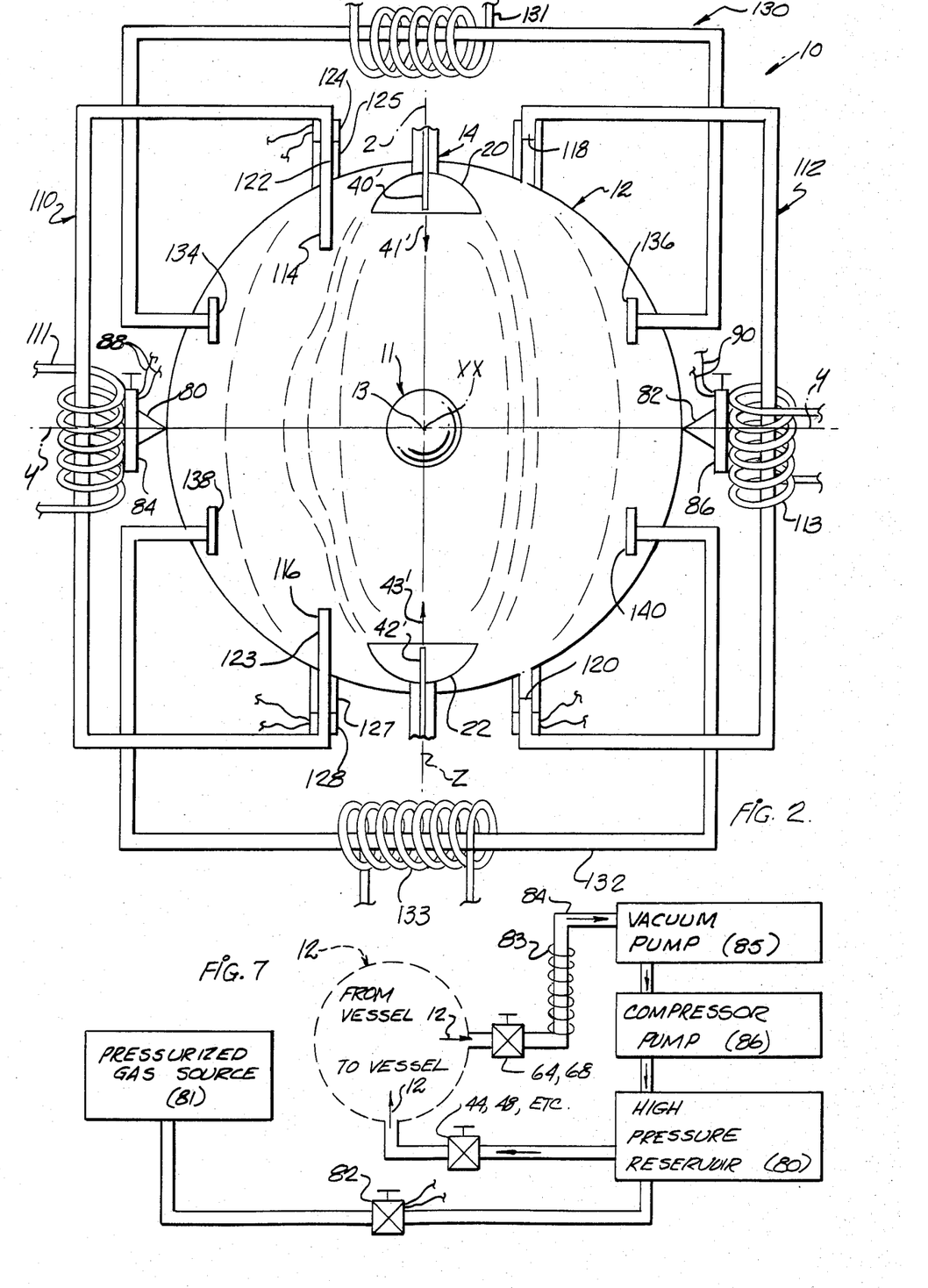
FIG. 2 is a schematic elevation view rotated 90° with respect to the elevation view of FIG. 1 showing certain additional and alternate features of a plasma containment device of the present invention.
FIG. 7 is a schematic diagram illustrating a gas supply and circulation system which may be used with the present invention.

Gas ionization means, which may also comprise means for maintaining or increasing the energy level in the plasma ball 11 subsequent to its initial generation, may comprise a plurality of energy devices positioned at various points about the periphery of the containment vessel 12 such as ionization devices 80, 82 which may be lasers, R-F generators, ion beam generators or other conventional energy directing devices positioned in alignment with horizontal axis YY, as illustrated in FIG. 2. The gas ionization means preferably have a variably controllable power level such as power controls 84, 86 which may, in turn, be remotely controlled through control signals sent through control wires 88, 90. The ionization devices 80, 82 are initially operated at a relatively high power such as, for example, in the case of laser devices at about 1 megawatt during the initial gas ionization to form a hydrogen based plasma ball 11 and may subsequently be operated at a lower intensity to maintain the energy level within the plasma ball at a predetermined level. Alternately, energy may be continuously added to the plasma for various utilities such as, for example, producing a nuclear fusion reaction within the plasma for heat generation. An increased magnetic field intensity may be required to help achieve stability in the plasma ball at higher energy levels.

Figure 3:
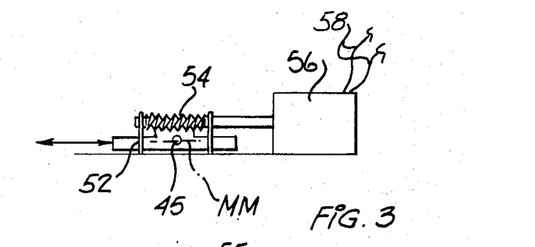
FIG. 3 is a schematic top view illustrating one embodiment of a gas nozzle positioning assembly.

Plasma ball positioning means are provided for controlling the relative position of the plasma ball within the containment vessel 12 in order to maintain the plasma ball at a position near the center of the vessel 12 to prevent the plasma ball from coming into touching contact with either the pole heads 20, 22 or the peripheral portions of the vessel 12 to prevent damage or energy loss. In one embodiment of the invention, as illustrated in FIGS. 1 and 2, the plasma ball positioning means consists of the primary magnetic field 24 and the gas jets 41, 43 which may be differentially operated to maintain the plasma ball 11 at a relatively centered position, as described above. As illustrated in FIG. 5, lateral positioning of the plasma ball may be further enhanced by the use of lateral gas jets 45, 47 operated by valves 49, 51, which may be constructed in a manner similar to gas jets 40, 42 to provide opposing lateral gas flows within the vessel 12. These gas jets may have offset axes MM, NN positioned in parallel slightly offset alignment with horizontal axis YY which may be used to produce rotation of plasma ball 11 about vertical axis ZZ. The rate of rotation of the plasma ball 11 may be varied by varying the discharge velocity of gas from gas jets 45 and 47. In a slightly different control scheme, as illustrated in FIG. 3 and, alternatively, in FIG. 4, the rotation rate of the plasma ball may be varied by changing the relative direction of the gas flow from jets 45 and 47. The lateral jets may each be mounted on a shifting assembly of the type shown in FIG. 3. In this arrangement, each of the lateral jets (only 45 shown) is mounted on a sliding ratchet assembly 52 which is caused to move in a horizontal direction perpendicular to axis YY by a drive screw 54 operatively mounted on a DC drive motor 56 which is, in turn, actuated by control signals from wires 58.

Figure 4:
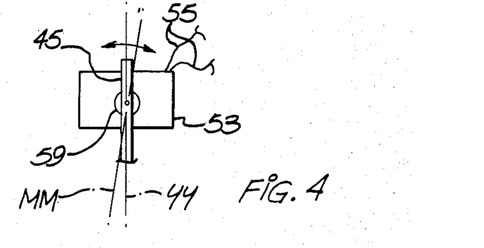
FIG. 4 is a schematic side elevation view illustrating another embodiment of a gas nozzle positioning assembly.
Figure 5:
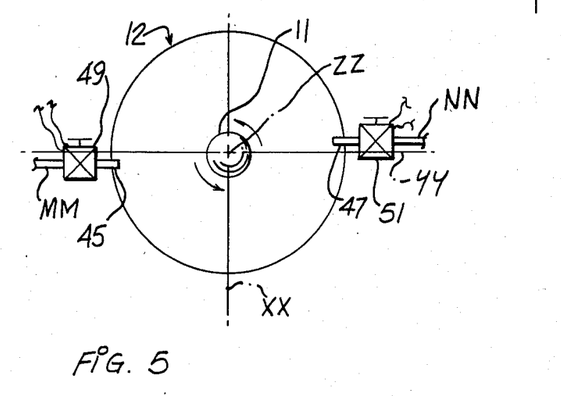
FIG. 5 is a schematic plan view illustrating the use of laterally oppositely positioned gas nozzles.

In the embodiment shown in FIG. 4, the rate of rotation of the plasma ball is controlled by pivoting each of the gas jets (only 45 shown in FIG. 4) about a vertical axis of rotation which may intersect axis YY. Angular deflection of axis MM relative to YY may be provided by mounting jet 45 on a pivot shaft 59 having a vertical axis and, in turn, operatively connected for rotation about its axis to a DC drive motor 53 controlled by control signals through wires 55. In yet another control scheme, both gas jet velocity and gas jet direction may be used to control the rotation rate of the plasma ball 11. It will be appreciated that opposing pairs of gas jets might be positioned in coaxial relationship with respect to any diameter of the vessel in order to facilitate the positioning of the plasma ball 11 and these plurality of gas jets may be selectively operated by a computer control system in order to achieve the desired shifting in position of the plasma ball 11.

An alternate plasma ball positioning means is illustrated in FIG. 2 in which plasma ball positioning is achieved by producing changes in the primary magnetic field 24 through the use of a series of secondary electromagnets including lateral control magnets 110, 112, etc. and vertical control magnets 130, 132, etc. Lateral control magnets 110, 112, etc. may comprise conventional iron cores surrounded by coils 111, 113, respectively, and may terminate in opposite pole heads 114, 116, 118, 120, etc. In one embodiment of the invention, each of the secondary magnets such as magnet 110, comprises a pair of extendable arms 122, 123 which are selectively extendable or retractable within a cylindrical enclosure 125, 127 communicating with the enclosure vessel 12. Each of the arms is extendable through an extension control motor 124, 128 for selectively extending or retracting the arms either in unison or differentially to change the relative shape of the magnetic field therebetween and to thereby change the shape of the primary magnetic field 24. In FIG. 2, the arms 122, 123 are shown in an equally extended position having the effect of deflecting the primary magnetic field in the direction to the left side of the drawing, as illustrated in FIG. 2, to produce relative leftward shifting of the plasma ball 11. In a slightly different method of control through the use of secondary magnets of a different type, vertical control magnets 130, 132, etc. having coils 131, 133, etc. are provided with fixed heads 134, 136, 138, 140, etc. Opposite heads 134, 136 are positioned at an upward portion of the vessel and opposite heads 138, 140 are positioned at a lower portion of the vessel. In this arrangement, shifting of the primary magnetic field is produced by changing the relative energy level through the coil 131, 133 associated with each magnetic in order to produce a distortion of the primary magnetic field 26. Although this method of controlling the magnetic field requires relatively simpler hardware than that required for physical displacement of the magnets, the difficulty in quickly changing the magnetic field associated with a fixed magnet through current control suggests that the method using differential physical displacement of the terminal portions of an electromagnet may be preferable in most applications. Although only four secondary magnets are illustrated, it will be appreciated that many such magnets may be required to obtain proper control. It will also be appreciated that although two different manners of controlling the secondary magnets are shown in FIG. 2, it will be preferable in most cases to use a single type of secondary magnet control.

Figure 6A:
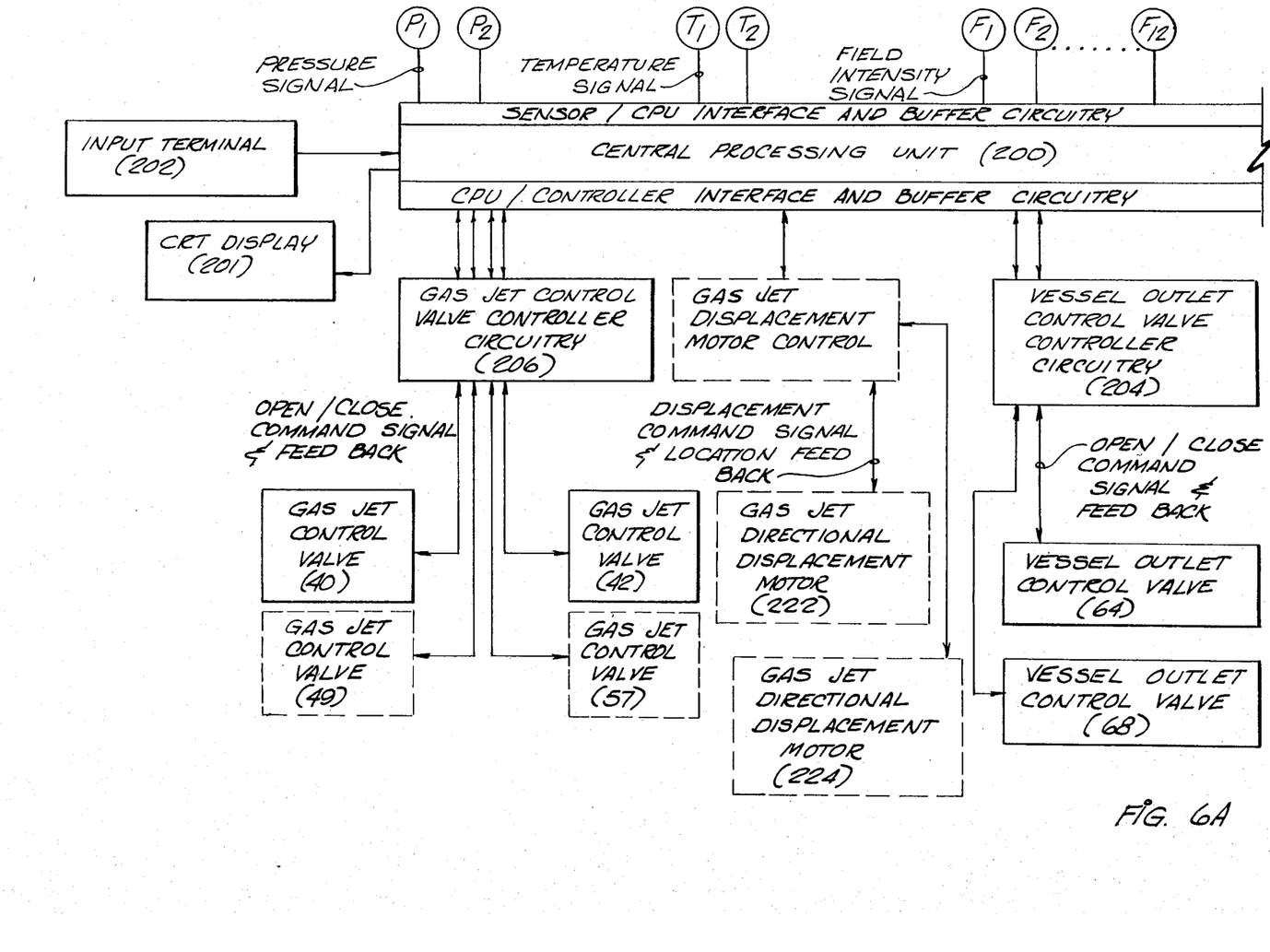
FIGS. 6A and 6B are component parts of a single schematic diagram illustrating the control system of the present invention.
Figure 6B:
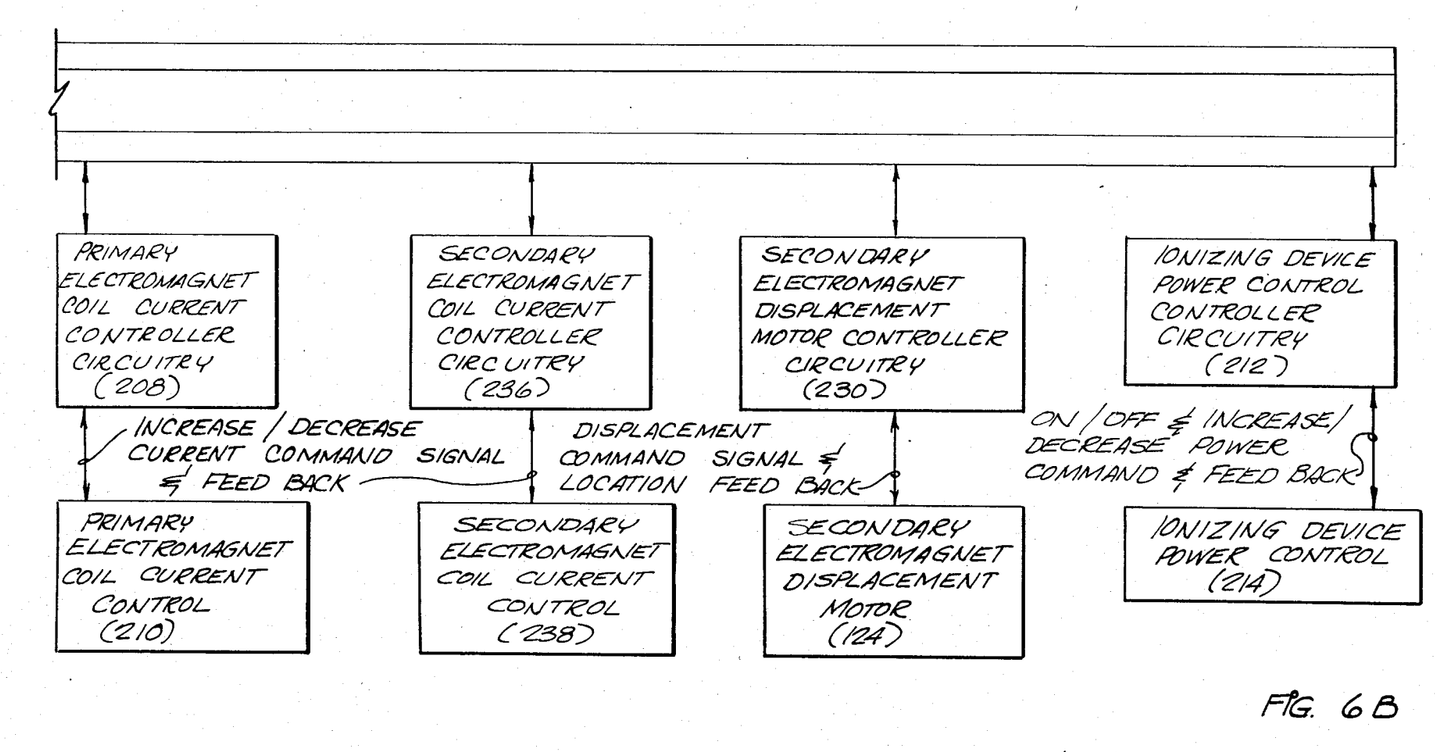

A plurality of sensor devices are provided within the vessel enclosure 12 in order to accurately monitor various conditions therein and to provide monitoring signals to a control system which may include a central processing unit 200, FIGS. 6A, 6B. The CPU 200 may process these signals to generate control signals for controlling the gas jet means, gas discharge means, primary magnetic means, secondary magnetic means and gas ionization and/or plasma energizing means. As illustrated in FIG. 1, a plurality of temperature probe means T1, T2 which may be conventional thermocouples may be positioned at various points within the control vessel. Pressure sensor means P1, P2 which may be heat resistant transducers may also be positioned within the vessel 12 for sensing the relative gas pressure therein. A plurality of energy field sensors F1 through F12, etc. may also be positioned about the periphery of the vessel 12 for sensing the relative position and/or the relative size of the plasma ball 11. In one embodiment, the field sensor devices comprise photoelectric cells for sensing the relative light intensity at various points about the vessel. In another embodiment, the field sensors comprise magnetic field sensing devices for sensing the relative magnetic intensity at various points about the periphery of the vessel 12. FIG. 1 illustrates that the field sensors F1 through F12 may be positioned in equally circumferentially spaced position about a single great circle analogous to a line of longitude on a globe. It will be appreciated that field sensors may be positioned about equally spaced lines of longitude, which may be every fifteen degrees in one preferred embodiment, in order to provide multiple uniformly positioned sensors for detecting the relative position of the plasma ball 11. It will be appreciated that the number of sensors may vary depending upon the size of the enclosure 12 and the sensitivity and type of the sensors being used. In the case of light detecting sensors, light from the plasma ball provides the light source which is sensed to determine the position of the plasma ball. A high speed central processing unit may be used to compare the relative intensities of the various sensors to determine the position of the plasma ball. As a matter of basic geometry, a diametrically opposed pair of sensors having the greatest difference between intensity levels would be indicative of the direction of displacement of the plasma ball from the center 13 of the containment vessel and the degree of difference would be indicative of the degree of such displacement from the center. Suitable control algorithms may be used by the computer to generate control signals to actuate the plasma ball positioning means to return the plasma ball to a centered position by generating a suitable force thereon either through the use of gas jets or the use of secondary magnets as described above. Similarly, magnetic field intensity sensors might be used to detect changes in the magnetic field 26 caused by nonsymmetrical positioning of the plasma ball therewithin. Through the use of an appropriate control algorithm, the position of the ball 11 could be calculated by CPU 200 and appropriate repositioning, preferably by nonmagnetic means, could be implemented through appropriate computer generated control commands. It will be appreciated by those having skill in the art that the same field sensors $F_1$–$F_{12}$, etc. used to provide monitoring signals for controlling the relative positioning of the plasma ball 11 within the vessel 12 may also be used to monitor the relative size and/or energy level of the plasma ball. These signals may in turn be used with an appropriate control algorithm to control the energy input to the plasma ball by the ionizing devices 80, 82 and the amount of heat extraction provided by gas flow through the vessel 12 or other heat extraction apparatus associated with the device 10 and may also be used to control the rotation rate of the plasma ball.

Operation of the plasma containment device 10 will now be described. The control system of the invention 10 is illustrated schematically in FIGS. 6A and 6B. It will be seen that, in general, the control system comprises a number of sensors P1, P2, T1, T2, F1, F2, etc. which provide associated sensor signals to the central processing unit 200 of a conventional high speed digital computer of the type used for scientific applications. The signals are provided to the central processing unit through appropriate interface and buffer circuitry such as is conventionally used to filter out signal noise and to place sensor signals in appropriate form to be received by central processing unit. Such circuitry may include analog to digital convertors, averaging circuitry, etc. as is well known in the computer arts. The control system also comprises a series of different control circuits which are associated with various physical control devices such as electronically operable solenoid control valves and DC displacement motors, etc. which are actuated in response to a signal sent to the associated control circuitry from the central processing unit 200. It will be appreciated by those having skill in the art that the control commands from the CPU 200 may first pass through different interface and buffer circuitry as required to interface the central processing unit with the various different control circuitry. Each of the control units actuated by the controller circuitry may also include conventional feedback devices such as tachometers, volt or current meters, pressure transducers, etc. (not shown) for producing a feedback signal indicative of the system control unit response to a particular control command. These feedback signals are sent to the controller circuitry and interface circuitry back to the central processing unit to enable the CPU to determine at what point to terminate or modify a control command. The use of feedback signals in association with system control components and a central processing unit is well known by those having skill in the computer arts and control components for implementing the control system shown generally in FIGS. 6A and 6B are readily available and may be purchased as off-the-shelf items.

At system startup, the central processing unit is given the command as through input terminal 202 to raise the pressure in the vessel to a predetermined pressure value sufficient for plasma formation in the gas of the type being used in the system. For example, if hydrogen gas is to be used for plasma formation, an initial pressure value within the vessel of approximately 1 psig would be appropriate. This pressure value might be input directly from the terminal or alternately different pressure values for a series of potential gases to be used in the device might be preprogrammed into the computer software enabling an operator to merely enter the name of the gas to be used. The CPU thereafter issues a command to the vessel outlet control valve controller circuitry 204 to close the associated vessel outlet control valves 64, 68 thereby sealing the vessel. Thereafter, the CPU 200 continually samples the pressure signals from pressure sensors P1, P2 until the desired pressure, which will hereinafter be referred to as the initialization pressure, is reached. Simultaneous with the control command to close the vessel outlet control valves 64, 68, the CPU issues a command to the gas jet control valve controller circuitry to open one or more of the gas jet control valves 40, 42 and, in one embodiment, 45, 47. The gas jet control valves upon being opened direct a flow of pressurized gas such as hydrogen into the vessel 12 until the initialization pressure is reached. In one embodiment, a display terminal such as conventional CRT 201 is provided to allow various system parameters such as pressure, temperature, etc. to be visually inspected by operating personnel. Upon reaching the initialization pressure, a control command is issued closing all of the control valves and thus causing the pressure in the vessel to be maintained at a constant pressure value. At the time of system startup, the CPU 200 is also directed through internal software to actuate the primary magnet 14 and issues a control command to the primary electromagnet coil current controller circuitry 208 which causes the primary electromagnet coil current control 210 to actuate a flow of current through coil 18 of a predetermined magnitude associated with the particular type of gas to be converted to a plasma. Thus, in a short period after system startup, the pressure vessel is provided with a pure gas at the initialization pressure and has a magnetic field of a predetermined intensity symmetrically positioned therein. Next, the central processing unit 200 is instructed, through appropriate software, to begin heating the gas at a central position within the magnetic field. The CPU 200 issues a control command to ionizing device power control controller circuitry 212 to initially turn on the ionizing device power control 214 to provide full power for ionizing the gas at the center of the magnetic field, and for creating a large circular electric current in the plasma. As discussed above, the ionizing device may be a laser, microwave, R-F generator or other energy directing source. The direction of the energy beam from the ionizing device may be directed initially toward the center of the sphere to ionize the gas and subsequently toward the periphery of the plasma ball to maintain a circular electrical current thereabout. During the period that the ionizing device is providing energy to initially ionize the gas, the central processing unit is continually sampling signals from the pressure temperature and field intensity sensors through which it may calculate the energy level of the gas within the vessel. The exact algorithm used for calculating this energy level may use a combination of the various sensors signals or may use only one type of sensor signal such as, for example, the temperature sensors in order to determine at what point the energy within the vessel has been raised sufficiently to indicate the presence of a plasma ball of the desired energy intensity.

When, through internal calculation, the CPU has sensed the presence of the plasma ball of the desired energy intensity, a control command is issued through circuitry 204 to the vessel outlet control valves 64, 68 to begin slowly evacuating the gas within the vessel at a speed sufficiently slow to prevent turbulence within the vessel. Within a relatively short period after the beginning of vessel depressurization, at least one pair of gas jet control valves such as control valves 45, 47 may be actuated by the CPU to cause rotation of the plasma ball about a predetermined axis within the vessel. The rate of flow provided by the control valves is such as to produce a laminar circulation flow about the plasma ball, again, of sufficiently low magnitude to prevent turbulence within the vessel. It may be desired to maintain the gas pressure within the vessel at a preset pressure value as the plasma ball is being rotated and to achieve this result, the central processing unit 200 may adjust the outflow rate through outlet control valve 64, 68 to balance the inflow of gas as from control valves 40, 42 to provide a constant pressure, steady state system operation. The rotation of the plasma ball within the magnetic field tends to produce and sustain an electric current within the plasma ball which tends to sustain the ball as indicated by the paper of Appendix A. As mentioned above, this current may be augmented through the addition of energy from the ionizing device directed tangentially to the periphery of the ball. The direction of the ionizing device beam may be controlled in a manner similar to that of gas jets 45, 47. The rate of rotation of the plasma ball may be changed, as discussed above, by varying the velocity of a gas jet couple directed toward the ball and may also be varied by slightly changing the direction of gas flow from the gas jet couple. Thus, in one embodiment, the rate of rotation may be changed through control commands issued to the gas jet control valves to cause relative increase or decrease in the flow rate therefrom and, in another embodiment, may be controlled by a command issued to gas jet displacement motor control circuitry 220 which, in turn, causes actuation of gas jet directional displacement motors 222, 224 which may be of a type indicated in FIGS. 3 and 4 as DC motors 56 and 53. The rate of rotation and thus the gas jet speed or gas jet deflection for a particular plasma ball, may be determined by empirical methods for the particular gas type to be used and appropriate instructions for causing the proper gas jet operation may be provided in the control software, thus allowing the central processing unit to issue the proper controls for any gas type at the proper time and for the proper duration subsequent to initial plasma formation.

As discussed above, field sensors F1, F2, etc. may be of various types and may be used to provide field intensity signals which may be used by the central processing unit to calculate both the relative position of the plasma ball and the energy level of the plasma ball. Since the position of the plasma ball may be continuously calculated by the CPU, a threshold value may be provided which, when exceeded, will cause the central processing unit to actuate appropriate repositioning devices to urge the plasma ball back into a centered position within the containment vessel. The threshold value might be, for example, an off center displacement of two inches. In one embodiment, the lateral positioning of the plasma ball is controlled entirely by the primary magnetic field 24. In this embodiment, if the plasma ball begins to drift laterally, the energy level of the primary magnetic field 24 is increased, thus the CPU would merely issue a control command to the primary electromagnet coil current control 210 to increase the electric current through the electromagnet 14 to provide a stronger electromagnetic field to prevent lateral displacement of the plasma ball 11. In this same arrangement, the relative vertical position of the plasma ball is controlled by differential application of gas from vertical jets 41, 43. Thus, for example, in response to the plasma ball 11 drifting upwardly, the relative gas flow rate from jet 41 would be increased with respect to the flow rate from jet 43 by a control command incrementally opening gas jet valve 40 and closing gas jet control valve 42 until the plasma ball 11 had returned to a central position. In another embodiment, lateral gas jets such as gas jets 45, 47 having control valves 49, 51, are actuated in the same manner as described above with respect to gas jets 40, 42 to control the lateral position of the plasma ball 11 as opposed to increasing or decreasing the strength of magnetic field 24. It will be appreciated that a plurality of diametrically opposed gas jets similar to jets 45, 47 may be positioned about the periphery of the vessel 12 to facilitate movement of the plasma ball 11 in any desired direction. In another embodiment, a lateral and vertical control of the plasma ball 11 are both provided by varying the magnetic field 24 to cause a resulting differential force on the plasma ball to urge it in a desired direction. The change in the shape of the primary magnetic field 24 is produced by secondary magnets, which as illustrated in FIG. 2 with reference to magnets 110 and 112, may include a motor control 124 for causing displacement of the terminal ends of the magnet into and out of the vessel which may be implemented by issuing a control command through displacement motor controller circuitry 230 to cause the secondary electromagnetic displacement motors 124 or 128, etc. to be simultaneously extended or retracted or to be differentially extended or retracted. In another embodiment, as illustrated by magnets 130, 132 in FIG. 2, the magnets remain stationary and the current to the magnetic coil is varied to achieve the resulting secondary magnetic field which influences the shape of the primary magnetic field 26. Thus, in this arrangement, the CPU issues a command through secondary electromagnet coil current controller circuitry 236 to cause secondary electromagnet coil current control 238 to either increase or decrease the current in an associated secondary electromagnet coil.

The energy level of a plasma ball generated in the vessel, as described above, may be increased through further application of energy through ionizing devices such as 80, 82. The energy level desired of a particular plasma ball may vary depending upon the particular application of the device 10. For example, if it is desired to increase the energy level to a temperature sufficient for nuclear fusion, extreme energy must be directed into the plasma ball for a relatively long duration; whereas, if it is merely desired to maintain a plasma ball at a relatively low energy state, relatively low level application of energy to the plasma ball may be sufficient. It will be noted that the circulatory gas flow around the plasma ball will cause energy transfer from the plasma ball which must be compensated for through more or less continuous application of energy from the ionizing devices. The energy level necessary to maintain the plasma ball may thus be calculated based on the momentary energy of the plasma ball as detected by the various sensors and calculated by the central processing unit or may be determined in a control loop which includes the flow rates of gas into and out of the control vessel to predict the energy requirements of the plasma ball. When, through appropriate calculation, the central processing unit has determined that the plasma ball requires additional energy, a control command is issued through the ionizing device power control controller circuitry 212 to direct energy either in short duration bursts or in continuous application at a selected power level to the plasma ball through appropriate actuation of the ionizing device power control 214. If thermonuclear reactions are in progress, no energy need be supplied to the ball, except to maintain the circular electric current. Since the resistance of plasma at this temperature is exceedingly low, little energy will be required to maintain the current.

It is contemplated that the inventive concepts herein described may be variously otherwise embodied and it is intended that the appended claims be construed to include alternative embodiments of the invention except insofar as limited by the prior art.

What is claimed is:

1. A plasma containment device for generating and sustaining a ball of plasma therein comprising:
    (a) enclosure means for providing a sealed environment for plasma formation;
    (b) primary electromagnet means having oppositely positioned pole pieces positioned in coaxial alignment with a magnetic field central axis for generating a primary magnetic field in said enclosure means;
    (c) gas jet means positioned at terminal end portions of pole pieces in generally parallel alignment therewith for providing gas under pressure to said enclosure means for subsequent ionization for plasma ball formation during an initial pressurization mode of operation and for preventing touching contact between said electromagnet opposite pole pieces and a plasma ball generated in said enclosure in a plasma ball sustaining mode of operation;
    (d) gas discharge means for selectively sealing said enclosure during said initial pressurization mode of operation and for discharging gas from said enclosure during said plasma ball sustaining mode of operation;
    (e) gas ionization means for ionizing gas at a central position within said magnetic field during said initial pressurization mode of operation;
    (f) plasma energizing means for selectively providing energy to said plasma ball during said plasma ball sustaining mode of operation for maintaining an energy level in said plasma ball of a selected magnitude.

2. The invention of claim 1 wherein said gas jet means is constructed and arranged so as to provide a circular airflow about a plasma ball positioned in centered symmetrical relationship between said electromagnet pole pieces whereby said plasma ball is rotated about an axis parallel to said magnetic field central axis.

3. The invention of claim 2 wherein said gas jet means comprises a first gas jet having a centerline positioned in perpendicular offset relationship with said magnetic field centerline and a second gas jet having a centerline positioned in perpendicular offset relationship with said magnetic field centerline in a direction opposite the offset direction of said first gas jet whereby a circular airflow is provided about a plasma ball positioned symmetrically between said opposite pole pieces.

4. The invention of claim 2 wherein said gas jet means comprise a first gas jet having a centerline positioned in skewed relationship with a field axis intersecting and perpendicular to said magnetic field centerline and a second gas jet having a centerline positioned in oppositely skewed relationship with said field axis intersecting and perpendicular to said magnetic field centerline.

5. The invention of claim 1 further comprising gas pressure sensing and control means for monitoring and controlling the gas pressure in said enclosure whereby a first relatively high gas pressure is provided during said initial pressurization mode of operation of sufficient pressure for plasma formation by ionization of said gas at a central portion of said magnetic field by said ionization means and whereby a second relatively lower gas pressure is maintained during said plasma ball sustaining mode of operation.

6. The invention of claim 5 wherein said gas pressure sensing and control means comprises:
pressure probe means positioned in said enclosure means for sensing the gas pressure therein and for generating a pressure signal in response thereto;
signal processing means for receiving and processing said pressure signal and generating a pressure control signal in response thereto; and
gas discharge means control valve means for receiving said pressure control signal from said signal processing means and being selectively openable and closeable in response thereto.

7. The invention of claim 1 further comprising a plasma ball position monitoring and control means for continuously monitoring the position of said plasma ball within said enclosure and for periodically adjusting the position of said plasma ball so as to maintain said plasma ball at a relatively centered position between said electromagnet pole pieces.

8. The invention of claim 7 wherein said plasma ball position monitoring and control means comprise energy field sensing means for sensing an energy field associated with said plasma ball position in said enclosure and generating a control signal indicative of the position of said plasma ball.

9. The invention of claim 7 wherein said plasma ball position monitoring and control means comprise:
a plurality of energy field intensity sensors positioned at predetermined positions within said enclosure, said energy field intensity sensors generating signals indicative of the energy field intensity at said sensor positions;
central processing means for receiving said signals from said energy field intensity sensors and calculating the relative position of said plasma ball within said enclosure means therefrom and for generating plasma ball position adjustment signals in response thereto; and
plasma ball positioning means for receiving said plasma ball adjustment signals and for producing relative movement of said plasma ball within said enclosure in response to said signals.

10. The invention of claim 9 wherein said energy field intensity sensors comprise light intensity sensors.

11. The invention of claim 9 wherein said energy field intensity sensors comprise magnetic field intensity sensors.

12. The invention of claim 9 wherein said plasma ball positioning means comprises adjustable flow gas jet means.

13. The invention of claim 9 wherein said plasma ball positioning means comprises:
selectively variable secondary magnetic field generating means for selectively varying said primary magnetic field for causing relative shifting of said plasma ball therewithin.

14. The invention of claim 1 further comprising plasma ball energy level sensing and control means for continuously monitoring the energy level of said plasma ball and for selectively controlling the operation of said plasma energizing means for raising the energy level of said plasma ball to a preselected value and maintaining the energy level of said plasma ball at said preselected value.

15. The invention of claim 1 wherein said plasma energizing means comprises said plasma ionization means.

16. A plasma containment device for generating and sustaining a ball of plasma therein comprising:
enclosure means for providing a sealed environment for plasma formation;
primary electromagnet means having oppositely positioned pole pieces positioned in coaxial alignment with a magnetic field central axis for generating a primary magnetic field in said enclosure means;
gas jet means positioned at terminal end portions of pole pieces in generally parallel alignment therewith for providing gas under pressure to said enclosure means for subsequent ionization for plasma ball formation during an initial pressurization mode of operation and for preventing touching contact between said electromagnet opposite pole pieces and a plasma ball generated in said enclosure in a plasma ball sustaining mode of operation; wherein said gas jet means is constructed and arranged so as to provide a circular airflow about a plasma ball positioned in centered symmetrical relationship between said electromagnet pole pieces whereby said plasma ball is rotated about an axis parallel to said magnetic field central axis;
gas discharge means for selectively sealing said enclosure during said initial pressurization mode of operation and for discharging gas from said enclosure during said plasma ball sustaining mode of operation;
gas ionization means for ionizing gas at a central position within said magnetic field during said initial pressurization mode of operation;
plasma energizing means for selectively providing energy to said plasma ball during said plasma ball sustaining mode of operation for maintaining an energy level in said plasma ball of a selected magnitude;
gas pressure sensing and control means for monitoring and controlling the gas pressure in said enclosure thereby a first relatively high gas pressure is provided during said initial pressurization mode of operation of sufficient pressure for plasma formation by ionization of said gas at a central position of said magnetic field by said ionization means and whereby a second relatively lower gas pressure is maintained during said plasma ball sustaining mode of operation; wherein said gas pressure sensing and control means comprises:

pressure probe means positioned in said enclosure means for sensing the gas pressure therein and for generating a pressure signal in response thereto;

signal processing means for receiving and processing said pressure signal and generating a pressure control signal in response thereto; and gas discharge means control valve means for receiving said pressure control signal from said signal processing means and being selectively openable and closeable in response thereto;

plasma ball position monitoring and control means for continuously monitoring the position of said plasma ball within said enclosure and for periodically adjusting the position of said plasma ball so as to maintain said plasma ball at a relatively centered position between said electromagnet pole pieces; wherein said plasma ball position monitoring and control means comprise:

a plurality of energy field intensity sensors positioned at predetermined positions within said enclosure, said energy field intensity sensors generating signals indicative of the energy field intensity at said sensor positions;

central processing means for receiving said signals from said energy field intensity sensors and calculating the relative position of said plasma ball within said enclosure means therefrom and for generating plasma ball position adjustment signals in response thereto; and plasma ball positioning means for receiving said plasma ball adjustment signals and for producing relative movement of said plasma ball within said enclosure in response to said signals;

plasma ball energy level sensing and control means for continuously monitoring the energy level of said plasma ball and for selectively controlling the operation of said plasma energizing means for raising the energy level of said plasma ball to a preselected value and maintaining the energy level of said plasma ball at said preselected value.

17. A method for generating and maintaining a mass of plasma at a relatively fixed location comprising the steps of:

(a) directing purified gas of a predetermined molecular type under pressure into a confined enclosure until the gas pressure in the enclosure reaches a first predetermined value;

(b) maintaining the gas in the enclosure at the first predetermined pressure value;

(c) providing a primary magnetic field in the enclosure of a generally symmetrical predetermined configuration and predetermined intensity;

(d) adding sufficient energy to the pressurized gas at a central position within the magnetic field to ionize the gas so as to provide a plasma ball containing a large circular electric current at a centered position in the magnetic field;

(e) reducing the pressure in the vessel to below a second predetermined value;

(f) rotating the plasma ball through selective gas discharge from gas nozzles positioned near the periphery of the enclosure and subsequently discharging the gas from the enclosure;

(g) maintaining the plasma ball at a relatively central position within the enclosure through continuous application of the primary magnetic field and through gas discharge from gas nozzles discharging generally toward the center of the enclosure and positioned proximate terminal magnetic poles of the magnet providing the primary magnetic field.

18. The method of claim 17 comprising the further steps of:

(a) continuously monitoring the position of the plasma ball within the confined enclosure; and (b) periodically adjusting the position of the plasma ball so as to maintain the plasma ball substantially at a predetermined central position within the enclosure.

19. The invention of claim 18 wherein the step of monitoring the position of the plasma ball within the enclosure comprises the steps of:

(a) sensing the light intensity at a plurality of light sensors positioned at a plurality of predetermined positions about the enclosure;

(b) generating a plurality of light intensity indicating signals in response to said light sensing;

(c) sending said light intensity indicating signals to a data processing means;

(d) calculating the relative position of the plasma ball within the enclosure using said light intensity indicating signals and the known position of said light sensors.

20. The invention of claim 19 comprising the further steps of:

(a) generating control commands based on said calculated position of the plasma ball in the enclosure;

(b) issuing said control commands to plasma ball positioning means;

(c) actuating the plasma ball positioning means in accordance with said issued control commands to urge the plasma ball toward said predetermined central position within the enclosure.

21. The invention of claim 18 wherein the step of periodically adjusting the position of the plasma ball comprises the step of providing and adjusting a secondary magnetic field to change the shape of the primary magnetic field.

22. The invention of claim 21 wherein the step of adjusting the secondary magnetic field comprises changing the physical position of magnetic poles associated with the secondary magnetic field.

23. The invention of claim 21 wherein the step of adjusting the secondary magnetic field comprises the step of changing the intensity of the secondary magnetic field.

24. The invention of claim 18 wherein the step of periodically adjusting the position of the plasma ball comprises the step of direction at least one gas jet nozzle towards the plasma ball and applying a stream of gas to the ball in a direction toward which the ball must travel to return to a centered location within the enclosure.

25. The invention of claim 18 further comprising the steps of:

(a) continuously monitoring the energy level of the plasma ball; and (b) periodically adjusting supplying additional energy to the ball or extracting energy from the enclosure to bring the plasma ball to a selected energy level and to maintain the plasma ball at said selected energy level.

* * * * *